United States Patent
Saito

(10) Patent No.: US 8,352,136 B2
(45) Date of Patent: Jan. 8, 2013

(54) VEHICLE CONTROL SYSTEM DESIGNED TO MINIMIZE ACCELERATION SHOCK

(75) Inventor: Tatsuya Saito, Chiryu (JP)

(73) Assignee: Denso Corporation, Kariya (JP)

( * ) Notice: Subject to any disclaimer, the term of this patent is extended or adjusted under 35 U.S.C. 154(b) by 349 days.

(21) Appl. No.: 12/713,989

(22) Filed: Feb. 26, 2010

(65) Prior Publication Data

US 2010/0228453 A1   Sep. 9, 2010

(30) Foreign Application Priority Data

Mar. 4, 2009 (JP) ................................ 2009-050119

(51) Int. Cl.
   *G06F 19/00* (2011.01)
(52) U.S. Cl. ............... 701/54; 701/51; 701/67; 701/68; 701/84; 477/5; 477/70; 477/77; 477/84
(58) Field of Classification Search .................. None
   See application file for complete search history.

(56) References Cited

U.S. PATENT DOCUMENTS

| | | | | |
|---|---|---|---|---|
| 6,009,371 | A | * | 12/1999 | Kobayashi ............... 701/112 |
| 6,656,090 | B2 | * | 12/2003 | Matsumura et al. ......... 477/171 |
| 2004/0038774 | A1 | * | 2/2004 | Kuroda et al. ............ 477/3 |
| 2004/0192502 | A1 | | 9/2004 | Suzuki et al. |
| 2006/0009325 | A1 | * | 1/2006 | Ohtake et al. ............ 477/98 |
| 2008/0305925 | A1 | * | 12/2008 | Soliman et al. .......... 477/5 |
| 2010/0174459 | A1 | * | 7/2010 | Gibson et al. ........... 701/54 |

FOREIGN PATENT DOCUMENTS

| | | |
|---|---|---|
| JP | A-2001-055943 | 2/2001 |
| JP | A-2004-084679 | 3/2004 |
| JP | A-2004-286148 | 10/2004 |
| JP | A-2004-308511 | 11/2004 |
| JP | A-2006-153246 | 6/2006 |

OTHER PUBLICATIONS

Office Action issued in Japanese Application No. 2010-024314 dated Jun. 19, 2012 (with translation).

* cited by examiner

*Primary Examiner* — Tuan C. To
*Assistant Examiner* — Kevin P Mahne
(74) *Attorney, Agent, or Firm* — Oliff & Berridge, PLC

(57) ABSTRACT

A vehicle control system for an engine-powered vehicle equipped with an engine and an automatic transmission with a clutch. When a given engine stop requirement is met during running of the engine, the system stops the engine automatically. When a given engine restart requirement is met after stop of the engine, the system restarts the engine and enters a clutch control mode to bring the clutch in the automatic transmission into a slippable state in which the clutch is permitted to slip based on the speed of the vehicle, thereby absorbing the acceleration shock which usually occurs upon engagement of the clutch to transmit engine torque to wheels of the vehicle when the engine is restarted, and the speed of the vehicle is relatively low.

7 Claims, 5 Drawing Sheets

VEHICLE CONTROL SYSTEM DESIGNED TO MINIMIZE ACCELERATION SHOCK

CROSS REFERENCE TO RELATED DOCUMENT

The present application claims the benefit of Japanese Patent Application No. 2009-50119 filed on Mar. 4, 2009, the disclosure of which is incorporated herein by reference.

BACKGROUND OF THE INVENTION

1. Technical Field of the Invention

The present invention relates generally to a vehicle control system designed to stop and restart an engine automatically which is mounted in an automotive vehicle equipped with an automatic transmission, and more particularly, to such a vehicle control system designed to minimize or absorb acceleration shock occurring upon start of the vehicle.

2. Background Art

There are some of the above type of vehicle control systems which are designed to suppress an acceleration shock arising from transmission of engine torque to an axle of the vehicle when the engine is restarted with the automatic transmission placed in the drive (D) range. For example, Japanese Patent First Publication No. 2001-55943 discloses such a vehicle control system which measures the degree of acceleration shock when the vehicle has been started and, when the measured acceleration shock is determined to be greater in magnitude than a given allowable acceleration shock, decreases the quantity of fuel to be injected into the engine to reduce the engine torque.

The decrease in quantity of fuel to be injected into the engine, however, may result in a deterioration in startability of the engine. There are, therefore, some limits to the decrease in quantity of fuel to be sprayed into the engine, which may be insufficient to suppress or absorb the acceleration shock.

SUMMARY OF THE INVENTION

It is therefore an object of the invention to provide a vehicle control system for an engine-powered vehicle designed to minimize or absorb acceleration shock occurring upon start of the vehicle without sacrificing the startability of an engine.

According to one aspect of the invention, there is provided a vehicle control system which is used with an automotive idle stop system (i.e., an engine stop/restart system) installed in a vehicle equipped with an engine and an automatic transmission in which a clutch is disposed to establish mechanical connection between an input shaft leading to the engine and an output shaft leading to a wheel of the vehicle when the automatic transmission is placed in a travel gear range. The vehicle control system comprises: (a) a vehicle speed sensor which measures a speed of a vehicle; and (b) a controller which operates in a stop mode and a restart mode, selectively. When a given engine stop requirement is met during running of the engine of the vehicle, the controller enters the stop mode to stop the engine automatically. When a given engine restart requirement is met after stop of the engine, the controller enters the restart mode to restart the engine and also enters a clutch control mode to bring the clutch in the automatic transmission into a slippable state in which the clutch is permitted to slip based on the speed of the vehicle, as measured by the vehicle speed sensor.

The clutch is engaged to connect between the input shaft and the output shaft when the automatic transmission is in the travel gear range (e.g., one of a drive, a first gear speed, a second gear speed, and a reverse range). The torque outputted by the engine is then transmitted to the output shaft and to the wheel through a torque transmission path in which, for example, an intermediate shaft or a gear(s) are disposed. When the given engine restart requirement is met with the automatic transmission placed in the travel gear range after stop of the engine, and the engine has been restarted, an increase in degree of the torque outputted from the engine may result in the acceleration shock.

When the automatic transmission is in the travel gear range, and the vehicle is running, the engine torque is being transmitted to the output shaft through the clutch. An output of the clutch connected directly to the input shaft depends upon the speed of the vehicle and the gear ratio of the automatic transmission. When the speed of the input shaft exceeds that of the output of the clutch upon restart of the engine, it may result in the acceleration shock. The degree of the acceleration shock, thus, depends upon the speed of the vehicle.

Consequently, when the engine is restarted, the controller brings the clutch in the automatic transmission into the slippable state based on the speed of the vehicle, as measured by the vehicle speed sensor. In other words, the controller may absorb the torque transmitted to the wheel through the clutch according to the degree of the acceleration shock. The slippage of the clutch serves to absorb the acceleration shock, thus ensuring the startability of the engine as compared with the conventional system, as discussed in the introductory part of this application, which decreases the quantity of fuel to be injected to the engine to decrease or eliminate the acceleration shock.

The clutch used in the automatic transmission may be designed to establish or block a torque transmission path extending from the input shaft to an intermediate shaft leading to the output shaft. The controller may work to bring the clutch which has been disengaged fully or engaged fully into the slippable state.

In the preferred mode of the invention, when the speed of the vehicle, as measured by the vehicle speed sensor, is lower than a given speed value upon restart of the engine, the controller places the clutch in the slippable state.

When the speed of the engine elevated by the restart of the engine has dropped below a peak thereof, the controller enters the clutch control mode to bring the clutch into the slippable state. In typical automatic transmissions equipped with a torque converter, the speed of the input shaft of the automatic transmission rises, and the torque transmitted to the input shaft increases while the speed of the engine is being increased by the restart of the engine. The engagement of the clutch while the speed of the engine is increased by restart of the engine, therefore, result in an increased degree of the acceleration shock. In order to minimize the acceleration shock, the controller, as described above, places the clutch in the slippable state when the speed of the engine has dropped below the peak thereof upon the restart of the engine.

The controller may place the clutch in one of the slippable state and a disengaged state in which the clutch is disengaged before the engine is restarted. When the speed of the vehicle, as measured by the vehicle speed sensor, is lower than the given speed value upon restart of the engine, the controller engages the clutch at a first rate. When the speed of the vehicle is higher than the given speed value upon the restart of the engine, the controller engages the clutch at a second rate faster than the first rate. In other words, when the speed of the vehicle is relatively slow, the controller increases the degree of engagement of the clutch slowly to absorb an excess of the torque (i.e., the acceleration shock) transmitted to the wheel through the clutch. Alternatively, when the speed of the vehicle is relatively high meaning that if occurring, the degree of the acceleration shock is low, the controller brings the clutch into engagement fast to bring the vehicle quickly into a condition in which the vehicle is enabled to run.

The automatic transmission may be equipped with an intermediate shaft which is to be connected to the input shaft through the clutch to transmit torque outputted from the engine to the wheel of the vehicle. In this case, the controller may calculate the peak of speed of the engine elevated by restart of the engine and place the clutch in one of the slippable state and the disengaged state when the speed of the intermediate shaft is lower than the calculated peak before the engine is restarted.

In typical automatic transmissions equipped with a torque converter, the speed of the input shaft continues to rise while the speed of the engine is being increased by the restart of the engine, so that the speed of the input shaft may rise up to the peak of the speed of the engine upon the restart of the engine. Thus, when the speed of the intermediate shaft is lower than the peak of the speed of the engine elevated by the restart of the engine, there is a possibility that the speed of the input shaft exceeds that of the intermediate shaft, which results in an increased degree of the acceleration shock when the clutch is in engagement upon restart of the engine. Consequently, the controller, as described above, may calculate the peak of speed of the engine elevated by the restart of the engine and place the clutch in one of the slippable state and the disengaged state when the speed of the intermediate shaft is lower than the calculated peak before the engine is restarted. This results in a decreased possibility that the acceleration shock occurs upon the restart of the engine.

The controller may determine the given speed value based on the calculated peak. This ensures the accuracy in determining a threshold value (i.e., the given speed value) for use in determining whether the clutch is to be placed in the slippable state or not.

When a condition in which the speed of the vehicle, as measured by the vehicle speed sensor, is lower than a given speed value is met upon restart of the engine, the controller places the clutch in the slippable state. In other words, when the speed of the vehicle is relatively high meaning that there is the low possibility that the acceleration shock occurs, the controller does not place the clutch in the slippable state, thereby increasing the number of times the engine torque needed to enable the vehicle to run is transmitted to the wheel quickly, which results in an increase in service life of the clutch.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENT

Figure 1:
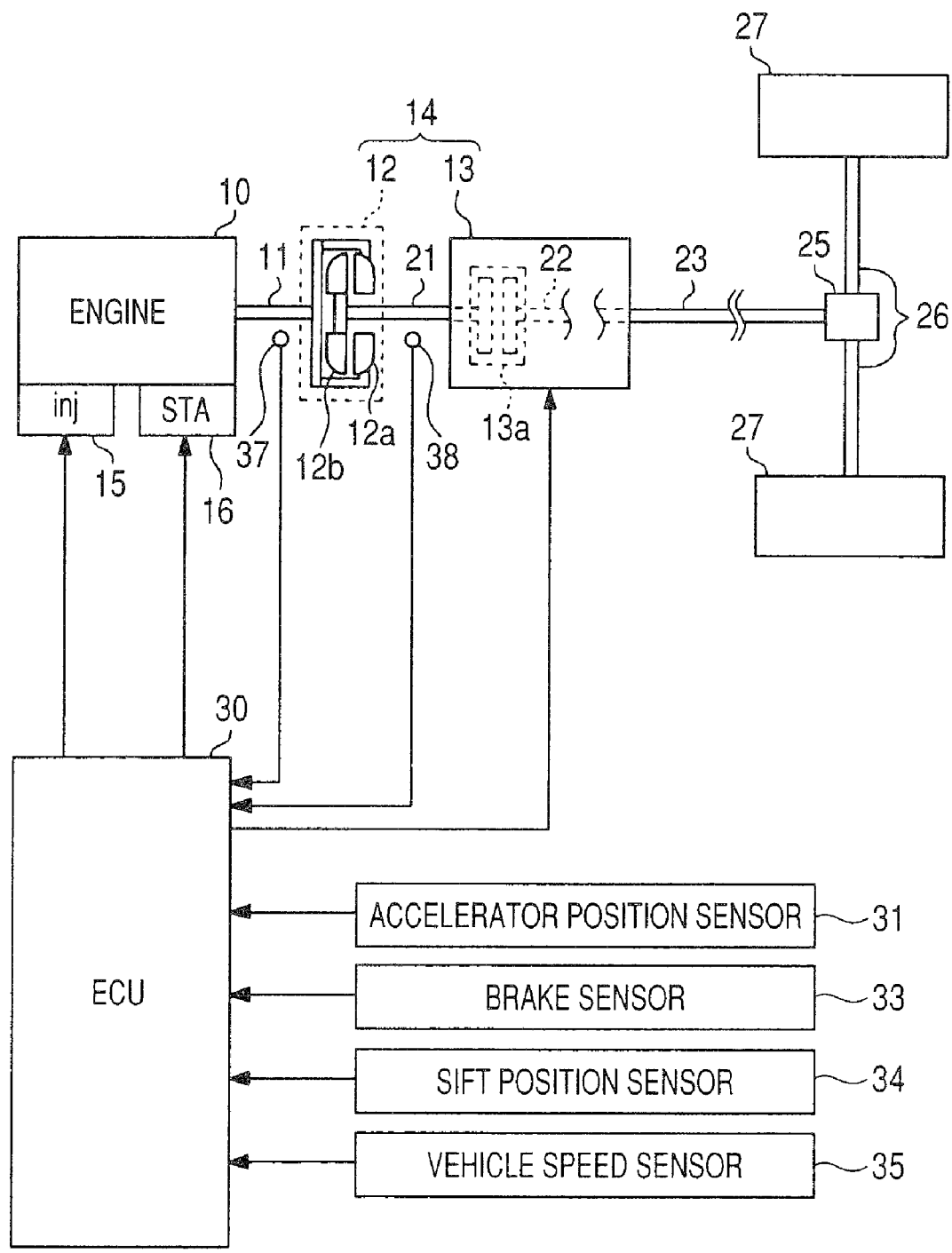
FIG. 1 is a block diagram which illustrates a vehicle control system according to the invention.

Referring to the drawings, particularly to FIG. 1, there is shown a vehicle control system according to the invention which is installed in an automotive vehicle equipped with an internal combustion engine 10 and an automatic transmission 14.

The automatic transmission 14 includes a torque converter 12 and a gearbox 13. The gearbox 13 is coupled to the crankshaft 11 (i.e., an output shaft) of the engine 10 through the torque converter 12. The engine 10 is, for example, a multi-cylinder gasoline engine and equipped with injectors 15 and spark plugs, one for each cylinder thereof. The engine 10 has installed thereon a starter 16 to crank or give initial rotation to the engine 10 when it is required to start the engine 10. The engine 10 may alternatively be a diesel engine.

The torque converter 12 is made up of a pump impeller 12a coupled to the crankshaft 11, a turbine impeller 12b coupled to an input shaft 21 of the gearbox 13, and a one-way clutch, etc,. The turbine impeller 12b rotates following rotation of the pump impeller 12a.

The bear box 13 is made up of a planetary gear drive, friction elements such as clutches or brakes, and a plurality of solenoid valves which controls the hydraulic pressure applied to the friction elements. Each of the solenoid valves is controlled in operation to establish engagement or disengagement of the friction elements to change a combination of gears of the planetary gear drive to develop a selected gear ratio. The gear box 13 has installed therein a clutch 13a which works to establish or block a torque transmission path extending from the input shaft 21 to the output shaft 23 and also establish a controllable slippage state thereof. The hydraulic pressure to be supplied to the clutch 13a is controlled variably by an oil control valve to alter the degree of engagement of the clutch 13a continuously at a selectable speed from an disengagement state to a complete engagement state. The vehicle control system also has an electric oil pump to supply the hydraulic pressure to the clutch 13a when the engine 10 is at rest.

The clutch 13a is hydraulically controlled to establish direct connection between the input shaft 21 and the intermediate shaft 22. Therefore, when the input shaft 21 and the intermediate shaft 22 are coupled together, they will rotate at the same speed. The intermediate shaft 22 transmits the torque to the output shaft 23 through gears and a rotary shaft.

The clutch 13a is, for example, a forward clutch which is to be engaged when the automatic transmission 14 is selectively placed in a forward travel gear range (i.e., the drive (D) range, the first gear speed range, or the second gear speed range) other than the parking (P) range, the reverse (R) range, the neutral (N) range. When the clutch 13a is engaged, it will cause the torque outputted from the engine 10 to be transmitted from the input shaft 21 to the output shaft 23. An exponential increase in torque inputted from the engine 10 to the input shaft 21 may, therefore, result in the acceleration shock.

The gearbox 13 has the output shaft 23 coupled to driven wheels 27 through a differential gear 25 and a drive shaft 26.

The vehicle control system also includes an electronic control unit (ECU) 30 which is implemented by a typical microcomputer and serves as a clutch controller. The ECU 30 also works to monitor output from various sensors, as will be described later, installed in the vehicle control system to control the quantity of fuel to be sprayed from each of the injectors 15 and perform engine control such as ignition control, control of the starter 16, and control of slippage of the clutch 13a. The vehicle control system includes an accelerator position sensor 31, a brake sensor 33, a shift position sensor 34, a vehicle speed sensor 35, an engine speed sensor 37, and an input shaft speed sensor 38. The accelerator position sensor 31 works to measure the position of the accelerator pedal (i.e., a driver's effort on the accelerator pedal). The brake sensor 33 works to measure the position of a brake pedal (i.e., a driver's effort on the brake pedal). The shift position sensor 34 works to detect the position of a shift lever of the automatic transmission 14. The vehicle speed sensor 35 works to measure the speed of the vehicle equipped with this system. The engine speed sensor 37 works to measure the rotation speed of the crankshaft 11, i.e., the speed of the pump impeller 12a to determine the speed of the engine 10.

The input shaft speed sensor 38 works to measure the speed of the input shaft 21 of the gear box 13, i.e., the speed of the turbine impeller 12b. The outputs from these sensors are inputted to the ECU 30.

Idle stop control (also called automatic engine stop/restart control) to be executed by the ECU 30 will be described below.

Specifically, when engine stop requirements are met during running of the engine 10, the ECU 30 stops the engine 10 automatically. Subsequently, when engine restart requirements are met, the ECU 30 restarts the engine 10 automatically. The engine stop requirements include, for example, at least one of conditions in which the brake pedal has been depressed, and the speed of the vehicle has dropped below a given idle stop speed TH1. The engine restart requirements include, for example, at least one of conditions in which the brake pedal is not depressed, and the accelerator pedal has been depressed when the engine 10 is at a stop.

The ECU 30 performs the idle stop control when the automatic transmission 14 is placed in the forward travel gear range (i.e., one of the D range, the second gear speed range, and the first gear speed range) and controls the degree of engagement of the clutch 13a to minimize or absorb the acceleration shock upon restart of the engine 10. Specifically, the ECU 30 enters an acceleration shock control mode following the engine stop mode and brings the clutch 13a into a slippable state based on the output from the vehicle speed sensor 35.

Figure 2A:
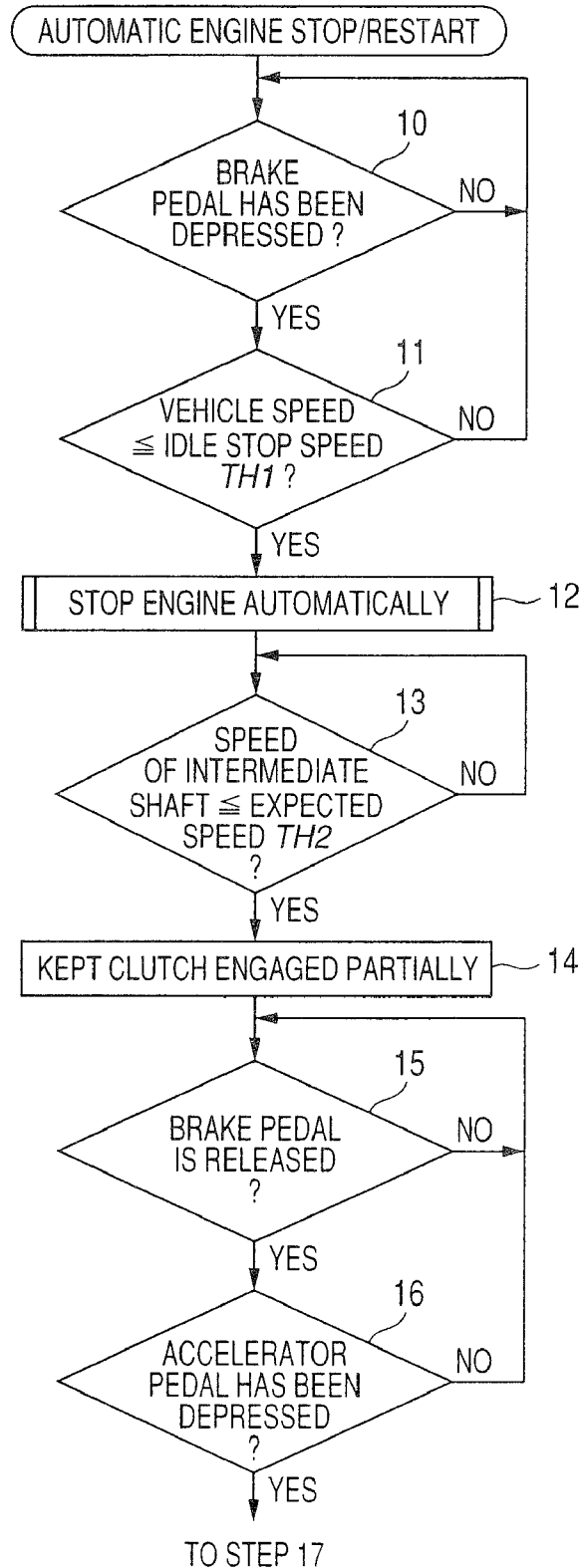
FIGS. 2(a) and 2(b) show a flowchart of an engine stop/restart program to be executed by the vehicle control system of FIG. 1 to stop or restart an engine automatically.
Figure 2B:
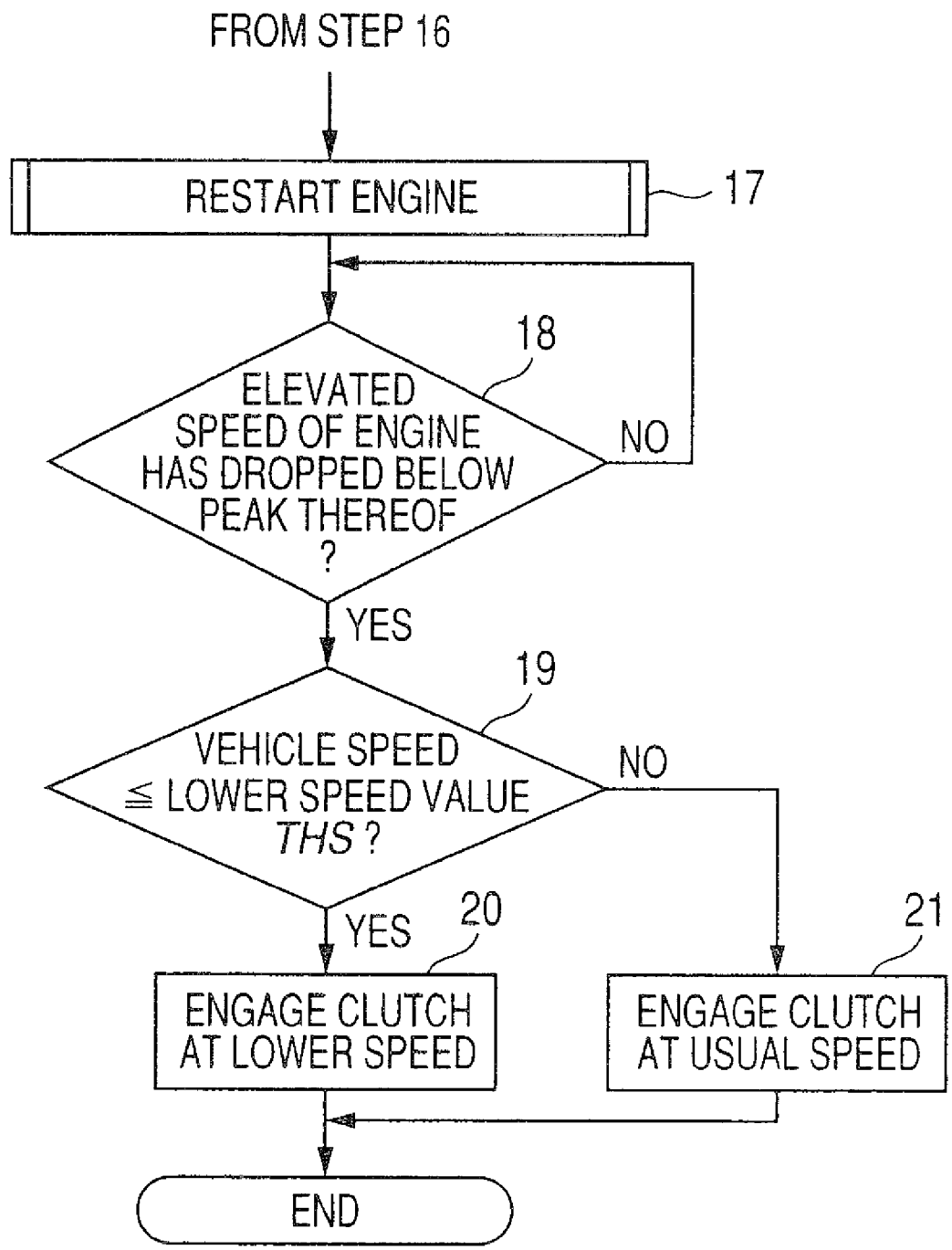

FIGS. 2(a) and 2(b) show a flowchart of a sequence of logical steps or program to be executed by the ECU 30 to control an automatic engine stop/restart operation.

After entering the program, the routine proceeds to step 10 wherein it is determined whether one of engine stop requirements in which the brake pedal has been depressed is met or not based on the output from the brake sensor 33. If a NO answer is obtained, then the routine repeats step 10. Alternatively, if a YES answer is obtained, then the routine proceeds to step 11 wherein it is determined whether the second of the engine stop requirements in which the speed of the vehicle, as measured by the vehicle speed sensor 35, is less than or equal to the idle stop speed TH1 or not. The idle stop speed TH1 is the speed of the vehicle at which the engine 10 is permitted to be stopped in safety when it is requested to stop the engine 10 during deceleration thereof and set to 20 km/h in this embodiment. This enables the engine 10 to be stopped before the vehicle is stopped completely, thus resulting in a decreased consumption of fuel.

If a YES answer is obtained meaning that the vehicle speed has dropped below the idle stop speed TH1, then the routine proceeds to step 12 wherein the engine stop mode is entered. Specifically, the ECU 30 stops the injectors 15 from spraying the fuel and also stops the spark plugs from igniting the mixture in the engine 10 to stop the engine 10. At this time, the intermediate shaft 22 of the gearbox 13 is being rotated by the torque transmitted from the wheels 27 running on the road. The automatic transmission is in the forward travel gear range, so that the input shaft 21 is coupled to the intermediate shaft 22 through the clutch 13a. The input shaft is, therefore, being rotated at the same speed as the intermediate shaft 22. Alternatively, if a NO answer is obtained in step 11, then the routine returns back to step 10 and determines again whether the engine stop requirements are met or not (in steps 10 and 11).

After step 12 in which the engine stop mode is entered to stop the engine 10, the routine proceeds to step 13 wherein it is determined whether the speed of the input shaft 21, as measured by the input shaft speed sensor 38, that is, the speed of the intermediate shaft 22 is lower than or equal to a speed TH2 or not which is the peak of speed of the engine 10 expected to be elevated by restarting the engine 10. In this embodiment, the speed TH2 is set to the peak of a rise in speed of the engine 10 which was measured upon restart of the engine 10 in the previous engine restart cycle. This ensures the accuracy in determining the peak of speed of the engine 10 expected as arising from the following restarting of the engine 10. The speed TH2 may alternatively be given by the peak of the rise in speed of the engine 10 which is corrected as a function of an operating condition of the engine 10 such as the temperature of cooling water for the engine 10 or a value pre-fixed depending upon the characteristics of the engine 10.

If a YES answer is obtained in step 13 meaning that the speed of the intermediate shaft 22 is lower than or equal to the speed TH2 that is expected as the peak of the rise in speed of the engine 10 arising from the following restarting of the engine 10, then the routine proceeds to step 14 wherein the clutch 13a is brought into partial engagement and kept as it is, in other words, the degree of engagement of the clutch 13a is so controlled that the clutch 13a is allowed to slip to create relative rotation between the input shaft 21 and the intermediate shaft 22. Usually, there is a possibility that the speed of the input shaft 21 of the gearbox 13 is elevated up to the peak (i.e., the speed TH2) of the speed of the engine 10 elevated upon restart thereof, so that it exceeds the speed of the intermediate shaft 22 and results in the acceleration shock. In order to absorb such acceleration shock, the ECU 30 controls the degree of engagement of the clutch 13a in advance so as to absorb the torque transmitted to the intermediate shaft 22 (i.e., the wheels 27) through the clutch 13a.

The acceleration shock may alternatively be avoided by disengaging the clutch 13a completely upon restart of the engine 10, but however, it will cause the input shaft 21 and the turbine impeller 12b of the gearbox 13 disconnected by the clutch 13a from the intermediate shaft 22 to decrease in speed to a stop, which may result in deterioration of response of the vehicle to the demand of acceleration after the engine 10 is restarted. In contrast, when the clutch 13a is engaged partially to be slippable, it will ensure a certain degree of rotation of the input shaft 21 and the turbine impeller 12b and permit the clutch 13a to be brought quickly into a degree of engagement which is enough to ensure the running of the vehicle. This enhances the response of the vehicle to the demand of acceleration.

After the clutch 13a is kept engaged partially in step 14, the routine proceeds to step 15 where it is determined whether one of engine restart requirements in which the brake pedal is released is met or not based on the output from the brake sensor 33. If a NO answer is obtained, then the routine repeats step 15. Alternatively, if a YES answer is obtained, then the routine proceeds to step 16 wherein the second of engine restart requirements in which the accelerator pedal has depressed is met or not based on the output from the accelerator position sensor 31. If a NO answer is obtained, then the routine returns back to step 15 and determines again whether the engine restart requirements are met or not (steps 15 and 16).

Alternatively, if a YES answer is obtained in step 16 meaning that the engine restart requirements are met, then the routine proceeds to step 17 wherein the engine restart mode is entered to restart the engine 10. Specifically, the ECU 30 turns on the starter 16 to crank the engine 10 and energizes the injectors 15 and the spark plugs to spray and ignite the fuel in the engine 10. The engine 10 then produces the torque, so that the speed of the pump impeller 12a increases. The torque is transmitted from the pump impeller 12a to the gearbox 13 to increase the speed of the input shaft 21.

After the engine 10 is restarted in step 17, the routine proceeds to step 18 wherein it is determined whether the speed of the engine 10 which has been elevated upon the restart thereof has started to drop below the peak thereof or not. Specifically, it is determined whether the speed of the crankshaft 11, as measured by the engine speed sensor 37, has changed from a rising phase to a falling phase or not. This determination is made to determine whether the condition in which a great degree of torque is being transmitted from the pump impeller 12a to the input shaft 21, so that the speed of the input shaft 21 is rising has been completed or not.

If a YES answer is obtained in step 18 meaning that the speed of the engine 10 elevated temporarily upon the restart thereof has dropped below the peak, then the routine proceeds to step 19 wherein it is determined whether the speed of the vehicle, as measured by the vehicle speed sensor 35, is lower than or equal to a given lower speed value THS or not. The speed of the intermediate shaft 22 of the gearbox 13 depends upon a selected gear ratio of the gearbox 13 and the speed of the vehicle. It is, therefore, determined in step 19 whether if the clutch 13a is now engaged completely, it will cause the speed of the input shaft 21 to be greater than that of the intermediate shaft 22 or not. The lower speed value THS is so determined that the speed of the intermediate shaft 22 is equal to the peak of speed of the engine 10 elevated upon the restart thereof (i.e., the expected speed TH2). In other words, the lower speed value THS is so determined that when the vehicle is traveling at the lower speed value THS, the speed of the intermediate shaft 22 will be identical with the expected speed TH2. The reason for the determination in step 19 is that when the speed of the input shaft 21 is greater than that of the intermediate shaft 22, and the clutch 13a is engaged, it may result in the acceleration shock, and in the contrary case, there is a low possibility of the acceleration shock. The lower speed value THS may be calculated based on the expected speed TH2 each time this program is executed or alternatively be determined and fixed in advance based on the characteristics of the engine 10.

If a YES answer is obtained in step 19 meaning that the speed of the vehicle, as measured by the vehicle speed sensor 35, is lower than or equal to the lower speed value THS, then the routine proceeds to step 20 wherein the clutch 13a is brought into full engagement at a speed lower than usual. Specifically, the ECU 30 controls the oil control valve to decrease the rate at which the hydraulic pressure to be supplied to the clutch 13a is elevated normally to increase the torque transmitted from the input shaft 21 to the intermediate shaft 22 of the gearbox 13 at a decreased rate. In other words, the ECU 30 increases the degree of engagement of the clutch 13a at the decreased rate to absorb the acceleration shock.

Alternatively, if a NO answer is obtained in step 19 meaning that the speed of the vehicle, as measured by the vehicle speed sensor 35, is greater than the lower speed value THS, then the routine proceeds to step 21 wherein the clutch 13a is brought into the full engagement at a usual speed to transmit the engine torque to the wheels 27 quickly. This is because the speed of the input shaft 21 is thought of not as being greater than that of the intermediate shaft 22, and there is a low possibility that the acceleration shock occurs when the clutch 13a is brought into the full engagement.

After the clutch 13a is engaged in step 20 or 21, the routine terminates. The operations in steps 13 to 14 and 17 to 21 serve as a clutch control means for permitting the clutch 13a to slip.

Figure 3:
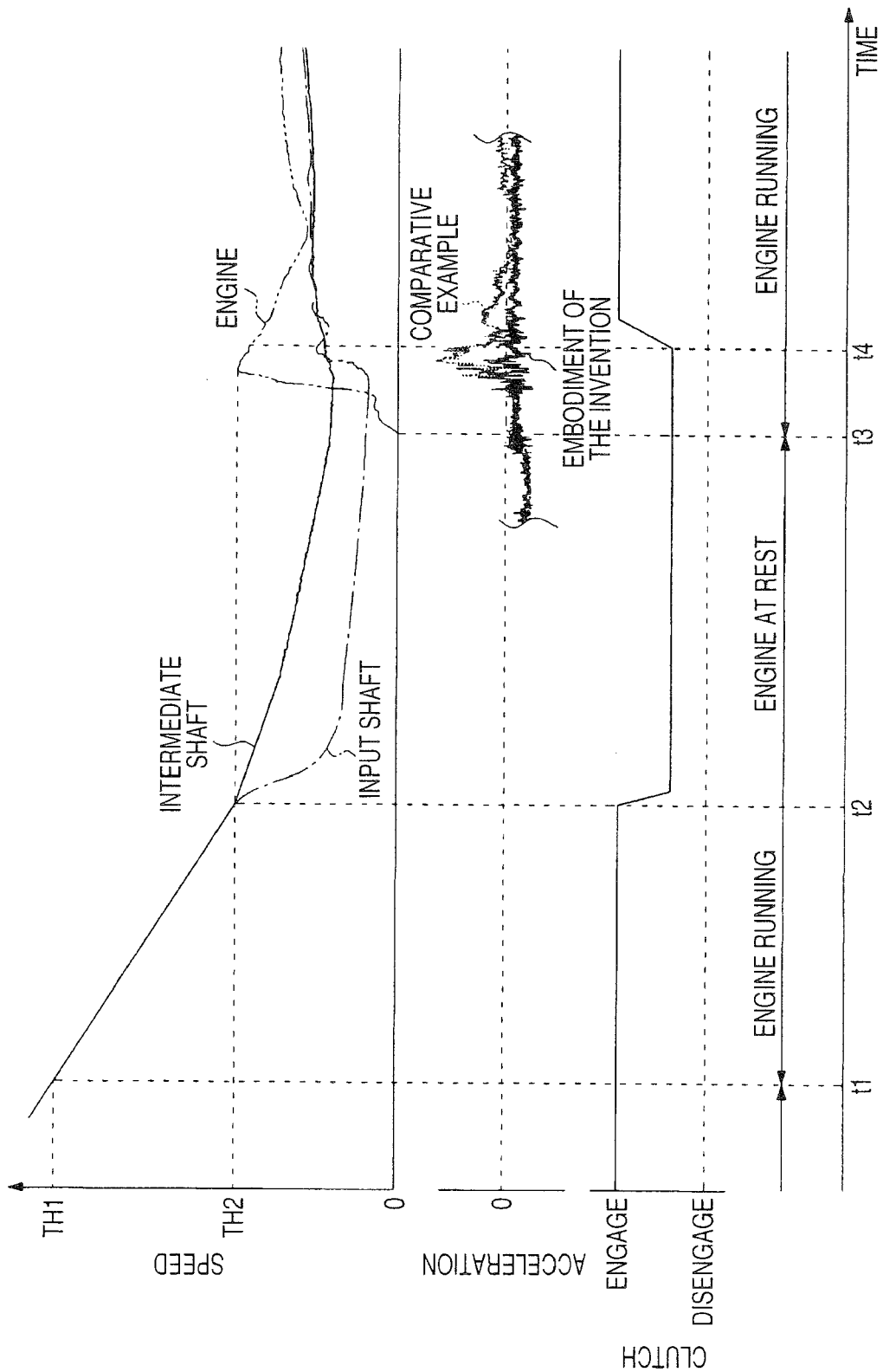
FIG. 3 is a view which demonstrates an operation of the vehicle control system to control the degree of engagement of a clutch installed in an automatic transmission to absorb the acceleration shock.

The above described automatic engine stop/restart control will also be explained with reference to FIG. 3. In the example of FIG. 3, the speed of the vehicle is lower than or equal to the lower speed value THS when the engine 10 is restarted.

The engine 10 is running. The automatic transmission 14 is placed in the D range. When the vehicle is decelerating, and the engine stop requirements are met at time t1, the ECU 30 enters the automatic engine stop mode to stop the engine 10 automatically. At this time, the intermediate shaft 22 of the gearbox 13 is in mechanical connection to the driven wheels 27 through the output shaft 23, the differential gear 25, and the drive shaft 26, so that the speed of the intermediate shaft 22 drops with a drop in speed of the vehicle. The input shaft 21 of the gearbox 13 is also in connection to the intermediate shaft 22 through the clutch 13a, so that the input shaft 21 is rotating at the same speed as that of the intermediate shaft 22.

At time t2, the ECU 30 concludes that the speed of the intermediate shaft 22 (i.e., the speed of the input shaft 21) is lower than or equal to the expected speed TH2 that is the peak of speed of the engine 10 elevated upon restart thereof and keeps the clutch 13a engaged partially to permit it to slip. After time t2, the torque transmitted from the intermediate shaft 22 to the input shaft 21 decreases, so that the speed of the input shaft 21 drops below that of the intermediate shaft 22. The torque transmitted from the partially engaged clutch 13a keeps the input shaft 21 rotating.

At time t3, when the engine restart requirements are met, the ECU 30 enters the engine restart mode to restart the engine 10. This causes the speed of the crankshaft 11 and the pump impeller 12a to rise. Subsequently, the speed of the input shaft 21 which has been kept lower than that of the intermediate shaft 22 rises.

At time t4, the ECU 30 concludes that the speed of the engine 10 elevated upon the restart thereof has dropped below the peak thereof and the current speed of the vehicle is lower than or equal to the lower speed value THS. The ECU 30, thus, engages the clutch 13a at the lower speed to absorb the acceleration shock. The acceleration of the vehicle changes as indicated by a solid line. In a comparative example where the clutch 13a is kept engaged fully, the acceleration of the vehicle changes, as indicated by a broken line. This shows that the acceleration shock is decreased greatly by the vehicle control system of the invention as compared with the comparative example.

Figure 4:
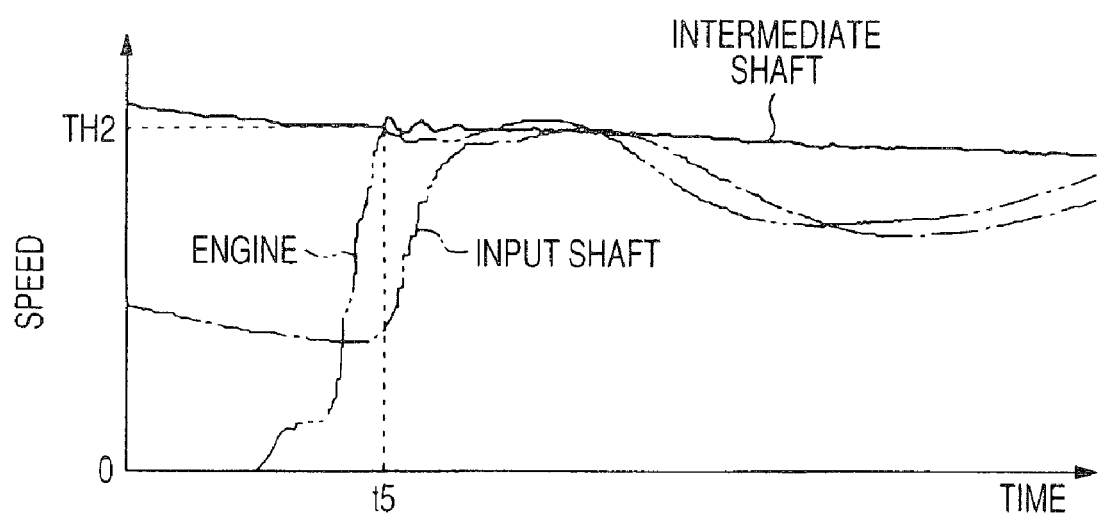
FIG. 4 is a view which demonstrates an operation of the vehicle control system of FIG. 1 when the speed of the vehicle is greater than a given lower speed value THS when the engine is restarted.

FIG. 4 illustrates an example in which the speed of the vehicle is greater than the lower speed value THS when the engine 10 is restarted.

Since the speed of the vehicle is greater than the lower speed value THS, the speeds of the intermediate shaft 22 and the input shaft 21 are kept higher than those in the example of FIG. 3. When the engine restart requirements are met, the ECU 30, like in FIG. 3, restarts the engine 10.

At time t5, the ECU 30 concludes that the speed of the engine 10 elevated upon the restart thereof has dropped below the peak thereof and the current speed of the vehicle is not lower than or equal to the lower speed value THS. The ECU 30, thus, engages the clutch 13a at the usual speed, that is, faster than that in the example of FIG. 3 where the speed of the vehicle is lower than the lower speed value THS when the engine 10 is restarted. The speed of the intermediate shaft 22 depending upon the speed of the vehicle and the gear ratio of the gearbox 13 is higher than that of the input shaft 21 upon the engagement of the clutch 13a. The possibility that the acceleration shock occurs upon the engagement of the clutch 13a is, thus, low.

The advantages, as offered by the vehicle control system, will be described below.

The ECU 30 is operable to engage the clutch 13a of the gearbox 13 of the automatic transmission 14 to establish mechanical connection between the input shaft 21 leading to the engine 10 and the output shaft 23 leading to the wheels 27 when the automatic transmission 14 is in the forward travel gear range (i.e., the D range, the first speed gear range, or the second speed gear range). The torque outputted by the engine 10 is, therefore, transmitted to the input shaft 21 and to the wheels 27 from the output shaft 23 through the torque transmission path in which the intermediate shaft 22 and the gears are installed. When the automatic transmission 14 is in the forward travel gear range, and the engine restart requirements are met after the engine 10 is stopped, the restart of the engine 10 may, as already described, result in the acceleration shock arising from an increase in torque outputted from the engine 10.

When the automatic transmission 14 is in the forward travel gear range, and the vehicle is running, the speed of the intermediate shaft 22 which transmits the torque to the output shaft 23 of the gearbox 13 and is coupled directly to the input shaft 21 depends upon the speed of the vehicle and the gear ratio of the gearbox 13. When the speed of the input shaft 21 of the gearbox 13 exceeds that of the intermediate shaft 22 upon the restart of the engine 10, the full engagement of the clutch 13a will result in the acceleration shock. The degree of the acceleration shock depends upon the speed of the vehicle upon restart of the engine 10.

In order to avoid or absorb the acceleration shock, the ECU 30 places the clutch 13a in the partial engagement in which the clutch 13a is permitted to slip based on the vehicle speed, as measured by the vehicle speed sensor 35, when the engine 10 has been restarted, thereby decreasing the degree of torque to be transmitted to the intermediate shaft 22 through the clutch 13a to absorb the acceleration shock. That is, the slippage of the clutch 13a absorbs the acceleration shock, thus ensuring the startability of the engine 10 as compared with the conventional system, as discussed in the introductory part of this application, which decreases the quantity of fuel to be injected to the engine 10 to decrease the acceleration shock.

Additionally, when the engine 10 has been restarted, and the speed of the vehicle, as measured by the vehicle speed sensor 35, is lower than the lower speed value THS, the ECU 30 permits the clutch 13a to slit for a given period of time, thereby decreasing the degree of the acceleration shock which usually appears depending upon the speed of the vehicle.

While the engine 10 has been restarted, and the speed thereof is rising, the speed of the input shaft 21 of the gearbox 13 is rising, and the torque transmitted to the input shaft 21 is increasing. Consequently, the engagement of the clutch 13a while the speed of the engine 10 is rising after the restart thereof may result in an increased magnitude of the acceleration shock.

In order to alleviate the above problem, the ECU 30 works to engages the clutch 13a fully which has been kept engaged partially after the speed of the engine 10, as restarted, has passed the peak thereof and starts to drop, thereby minimizing the acceleration shock with high reliability.

When the engine 10 is restarted, and the speed of the vehicle, as measured by the vehicle speed sensor 35, is lower than the lower speed value THS, the ECU 30 works to engages the clutch 13a at the rate slower than that when the speed of the vehicle is higher than the lower sped value THS, thereby absorbing the acceleration shock. When the speed of the vehicle is higher than the lower speed value THS, the clutch 13a is brought quickly into full engagement which ensures the running of the vehicle.

The ECU 30, as described above, places the clutch 13a in the partial engagement before the engine 10 is restarted, thereby permitting the clutch 13a to be brought quickly into full engagement as compared with when the clutch 13a is brought into full engagement from full disengagement. This ensures the running of the vehicle, which enhances the response of the vehicle to the demand of acceleration.

The automatic transmission 14 is equipped with the torque converter 12. The speed of the input shaft 21 of the gearbox 13, thus, continues to rise while the speed of the engine 10 is being increased by the restart of the engine 10, so that the speed of the input shaft 21 may rise up to the peak of the speed of the engine 10 upon the restart of the engine 10. Thus, when the speed of the intermediate shaft 22 of the gearbox 13 is lower than the peak of the speed of the engine 10 elevated by the restart of the engine 10, there is a possibility that the speed of the input shaft 21 exceeds that of the intermediate shaft 22, which results in the acceleration shock when the clutch 13a is placed in engagement.

The gearbox 13 has installed therein the intermediate shaft 22 which is to be coupled by the clutch 13a directly to the input shaft 21 to transmit the torque to the output shaft 23. The ECU 30 calculates or determines the peak of the speed of the engine 10 elevated by the restart thereof and, when the speed of the intermediate shaft 22 is lower than or equal to the peak of the speed of the engine 10 before the engine 10 is restarted, brings the clutch 13a into the partial engagement to permit it to slip, thereby decreasing the torque transmitted to the intermediate shaft 22 through the clutch 13a before the acceleration shock would occur upon restart of the engine 10 to transmit the torque to the wheels 27. This results in a decreased possibility that the acceleration shock occurs.

The ECU 30 determines the peak of the speed of the engine 10 elevated by the restart thereof (i.e., the expected speed TH2) and also determines the lower speed value THS based on the expected speed TH2, thereby ensuring the accuracy in setting a threshold value (i.e., the lower speed value THS) for use in determining whether the clutch 13a should be kept engaged partially or not. This minimizes the length of time the clutch 13a is placed in the partial engagement to ensure the service life of the clutch 13a as well as absorbing the acceleration shock when the engine torque is transmitted through the clutch 13a to the wheels 27.

While the present invention has been disclosed in terms of the preferred embodiment in order to facilitate better understanding thereof, it should be appreciated that the invention can be embodied in various ways without departing from the principle of the invention.

Therefore, the invention should be understood to include various modifications to the shown embodiment witch can be embodied without departing from the principle of the invention as set forth in the appended claims.

The ECU 30 of the above embodiment works to bring the clutch 13a into full engagement when the speed of the engine 10 which has been elevated by the restart thereof is determined as having dropped below the peak thereof, but may be designed to bring the clutch 13a into the full engagement before the speed of the engine has dropped below the peak.

The ECU 30 works to bring the clutch 13a into the partial engagement when the speed of the intermediate shaft 22 is determined as being lower than or equal to the expected speed TH2 that is the peak of speed of the engine 10 expected to be increased upon restart of the engine 10, but may be designed to keep the clutch 13a disengaged fully when such a condition is encountered. Additionally, the ECU 30 may bring the clutch 13a into the partial engagement except for when the speed of the intermediate shaft 22 is determined as being lower than the expected speed TH2, for example, when the speed of the intermediate shaft 22 is lower than or equal to the idle stop speed TH1.

The ECU 30 brings the clutch 13a into the partial engagement to permit it to slip before the engine 10 is restarted, and, when the engine 10 has been restarted, and the speed of the vehicle, as measured by the vehicle speed sensor 35, is lower than or equal to the lower speed value THS, brings the clutch 13a into the full engagement at a rate slower than that when the speed of the vehicle is higher than the lower speed value THS, but may bring the clutch into the full engagement at the same rate in the both cases. Specifically, the ECU 30 brings the clutch 13a into the full engagement from the partial engagement at a constant speed regardless of the speed of the vehicle. This also absorb the acceleration shock more than when the clutch 13a is not kept engaged partially before the clutch 13a is engaged fully to restart the vehicle.

When the speed of the vehicle, as measured by the vehicle speed sensor 35, is determined to be lower than or equal to the lower speed value THS, the ECU 30 brings the clutch 13a into the full engagement at the rate slower than usual, but may be designed to calculate the speed of the intermediate shaft 22 based on the speed of the vehicle and the gear ratio of the gearbox 13 and bring the clutch 13a into the full engagement at the slower rate when the calculated speed of the intermediate shaft 22 is determined as being smaller than the lower speed value THR. Alternatively, the ECU 30 may be designed to measure the speed of the intermediate speed using a speed sensor and bring the clutch 13a into the full engagement at the slower rate when the measured speed of the intermediate shaft 22 is determined as being smaller than the lower speed value THR.

When the engine 10 has been restarted to transmit the engine torque to the wheels 27, the ECU 30 places the clutch 13a in the partial engagement to permit it to slip until it is required to bring the clutch 13a into the full engagement to run the vehicle in each of cases where the speed of the vehicle, as measured by the vehicle speed sensor 35, is lower than and greater than the lower speed value THS, but may be designed to permit the clutch 13a to slip before the clutch 13a is brought into the full engagement to run the vehicle only when the speed of the vehicle, as measured by the vehicle speed sensor 35, is determined as being lower than the lower speed value THS. In other words, when it is required to restart the vehicle, but the speed of the vehicle is not lower than the lower speed value THS, the ECU 30 does not place the clutch 13a in the partial engagement to permit it to slip. This minimizes the number of times the acceleration shock absorbing operation is executed, in other words, increases the number of times the engine torque needed to enable the vehicle to run is transmitted to the wheels 27 quickly, which results in an increase in service life of the clutch 13a. Specifically, the ECU 30 keeps the clutch 13a engaged when the engine 10 is at rest, brings the clutch 13a into the partial engagement when the engine 10 has been restarted, and the speed of the vehicle, as measured by the vehicle speed sensor 35, is lower than or equal to the lower speed value THS, and then brings the clutch 13a into the full engagement to run the vehicle. Alternatively, when the speed of the vehicle is not lower than the lower speed value THS, the ECU 30 continue to keep the clutch 13a engaged fully.

The clutch 13a is installed between the input shaft 21 and the intermediate shaft 22 within the gearbox 13 and works to connect the input shaft 21 directly to the intermediate shaft 22, but may be disposed between the intermediate shaft 22 and the output shaft 23. In this case, the ECU 30 may control and place the clutch 13a in the partial engagement to permit it to slip in the same manner as described above. In the case where vehicle is so designed that it is also required to execute the automatic engine stop/restart operation when the automatic transmission 14 is placed in the reverse (R) range, the ECU 30 may place the clutch 13a in the partial engagement. Additionally, in the case where the vehicle is so designed that the automatic engine stop/restart operation is executed when the automatic transmission 14 is placed in a travel gear range, the vehicle control system of the invention may be used with a continuously variable transmission (CVT) as well as a multi-gear ratio transmission.

What is claimed is:

1. A vehicle control system for a vehicle equipped with an engine and an automatic transmission in which a clutch is disposed to establish mechanical connection between an input shaft leading to the engine and an output shaft leading to a wheel of the vehicle when the automatic transmission is placed in a travel gear range, comprising:
    a vehicle speed sensor which measures a speed of a vehicle; and
    a controller which operates in a stop mode and a restart mode, selectively, when a given engine stop requirement is met during running of an engine of the vehicle, said controller entering the stop mode to stop the engine automatically, when a given engine restart requirement is met after stop of the engine, said controller entering the restart mode to restart the engine and also entering a clutch control mode to bring the clutch in the automatic transmission into a slippable state in which the clutch is permitted to slip based on the speed of the vehicle, as measured by said vehicle speed sensor,
    wherein when the speed of the vehicle, as measured by said vehicle speed sensor. is lower than a given speed value upon restart of the engine, said controller places the clutch in the slippable state, and
    wherein said controller calculates a peak of speed of the engine elevated by restart of the engine and determines the given speed value based on the calculated peak.

2. The vehicle control system as set forth in claim 1, wherein when a speed of the engine elevated by the restart of the engine has dropped below a peak thereof, said controller enters the clutch control mode to bring the clutch into the slippable state.

3. The vehicle control system as set forth in claim 1, wherein said controller places the clutch in one of the slippable state and a disengaged state in which the clutch is disengaged before the engine is restarted, and wherein when the speed of the vehicle, as measured by said vehicle speed sensor, is lower than a given speed value upon restart of the engine, said controller engages the clutch at a first rate, when the speed of the vehicle is higher than the given speed value upon the restart of the engine, said controller engaging the clutch at a second rate faster than the first rate.

4. The vehicle control system as set forth in claim 3, wherein the automatic transmission has an intermediate shaft which is to be connected to the input shaft through the clutch to transmit torque outputted from the engine to the wheel of the vehicle, and wherein said controller calculates a peak of speed of the engine elevated by restart of the engine and places the clutch in one of the slippable state and the disengaged state when a speed of the intermediate shaft is lower than the calculated peak before the engine is restarted.

5. A vehicle control system for a vehicle equipped with an engine and an automatic transmission in which a clutch is disposed to establish mechanical connection between an input shaft leading to the engine and an output shaft leading to a wheel of the vehicle when the automatic transmission is placed in a travel gear range, comprising:

a vehicle speed sensor which measures a speed of a vehicle; and a controller which operates in a stop mode and a restart mode, selectively, when a given engine stop requirement is met during running of an engine of the vehicle, said controller entering the stop mode to stop the engine automatically, when a given engine restart requirement is met after stop of the engine, said controller entering the restart mode to restart the engine and also entering a clutch control mode to bring the clutch in the automatic transmission into a slippable state in which the clutch is permitted to slip based on the speed of the vehicle, as measured by said vehicle speed sensor, wherein said controller places the clutch in one of the slippable state and a disengaged state in which the clutch is disengaged before the engine is restarted, and wherein when the speed of the vehicle, as measured by said vehicle speed sensor, is lower than a given speed value upon restart of the engine, said controller engages the clutch at a first rate, when the speed of the vehicle is higher than the given speed value upon the restart of the engine, said controller engaging the clutch at a second rate faster than the first rate, and wherein said controller calculates a peak of speed of the engine elevated by restart of the engine and determines the given speed value based on the calculated peak.

6. The vehicle control system as set forth in claim 5, wherein when a speed of the engine elevated by the restart of the engine has dropped below a peak thereof, said controller enters the clutch control mode to bring the clutch into the slippable state.

7. The vehicle control system as set forth in claim 5, wherein the automatic transmission has an intermediate shaft which is to be connected to the input shaft through the clutch to transmit torque outputted from the engine to the wheel of the vehicle, and wherein said controller calculates a peak of speed of the engine elevated by restart of the engine and places the clutch in one of the slippable state and the disengaged state when a speed of the intermediate shaft is lower than the calculated peak before the engine is restarted.

* * * * *